United States Patent [19]

Berkowitz et al.

[11] 4,008,590
[45] Feb. 22, 1977

[54] AUTO STEERING WHEEL LOCK PROTECTOR

[76] Inventors: Joseph Berkowitz; Minerva Berkowitz, both of 8 Tyler Place, Hewitt, N.J. 07421

[22] Filed: Mar. 29, 1976

[21] Appl. No.: 671,366

[52] U.S. Cl. .................................. 70/424; 70/428
[51] Int. Cl.² .................................. E05B 17/14
[58] Field of Search ............ 70/38 A, 39, 416, 237, 70/417, 423, 424, 425, 426, 427, 428, 447, 14, 15, 18

[56] References Cited

UNITED STATES PATENTS

| | | | |
|---|---|---|---|
| 3,457,745 | 7/1969 | Barber | 70/424 |
| 3,665,738 | 5/1972 | Pescuma | 70/211 |
| 3,811,303 | 5/1974 | Robertson | 70/237 |
| 3,948,069 | 4/1976 | Imbriano | 70/428 |

*Primary Examiner*—Robert L. Wolfe
*Attorney, Agent, or Firm*—Richard L. Miller

[57] ABSTRACT

An anti-theft device mountable around a steering post column of an automotive vehicle so to enclose the vehicle ignition lock and prevent insertion of a key thereinto by an unauthorized person; the device consisting of strong metal case having an opening on one side into which the ignition lock protrudes from the steering post column, the case being secured to the column by means of a U-shaped rod that fits around the column and into openings in the case wherein toothed notches along the rod are engaged by a sliding plate rigidly prevented from sliding by being stationarily locked with a padlock.

1 Claim, 4 Drawing Figures

U.S. Patent  Feb. 22, 1977  4,008,590
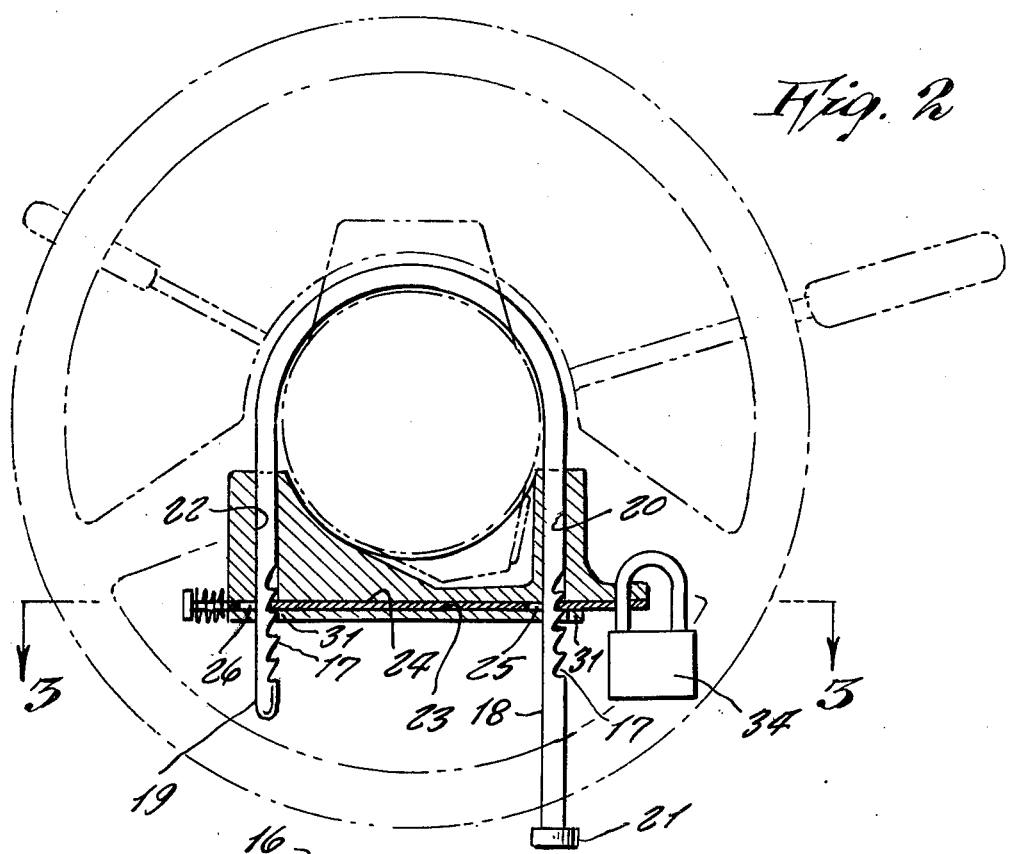
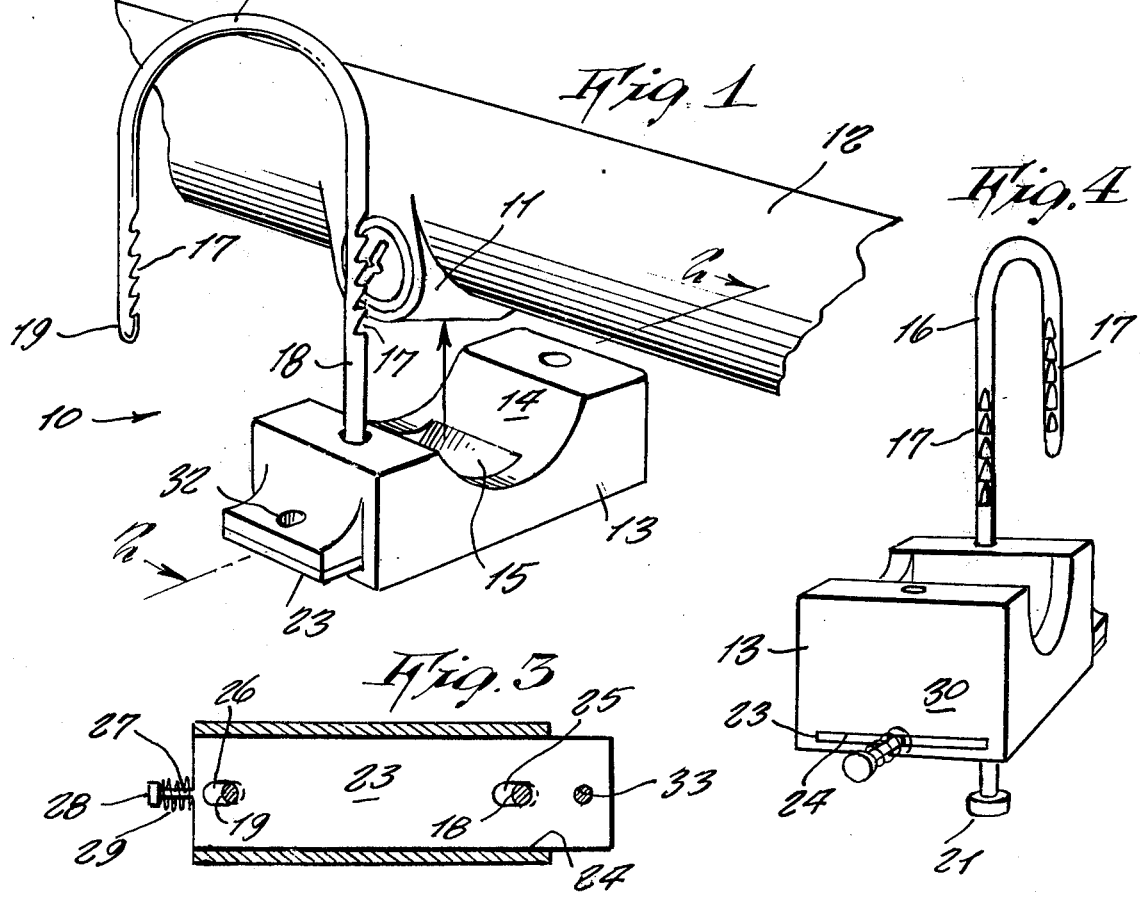

AUTO STEERING WHEEL LOCK PROTECTOR

This invention relates generally to automobile antitheft locks.

A principal object of the present invention is to provide a locking device that is attachable on a steering post of a car and which covers the ignition lock of the vehicle so that no prospective thief can insert a key thereinto and start the car engine.

Another object is to provide a locking device that is quickly and readily attachable or removable, and which does not need any tools to install nor deface or alter any of the vehicle existing structure.

Other objects are to provide an auto steering wheel lock protector which is simple in design, inexpensive to manufacture, rugged in construction, easy to use and efficient in operation.

Further objects of the invention will appear as the description proceeds.

To the accomplishment of the above and related objects this invention may be embodied in the form illustrated in the accompanying drawings, attention being called to the fact, however, that the drawings are illustrative only, and that changes may be made in the specific construction illustrated and described within the scope of the appended claims.

FIG. 1 is a perspective view of the invention shown in position for being installed.

FIG. 2 is a cross sectional view taken on line 2—2 of FIG. 1, and shown installed.

FIG. 3 is a cross sectional view taken on line 3—3 of FIG. 2.

FIG. 4 is a perspective view of the invention as viewed from a side that is opposite to that shown in FIG. 1.

Referring now to the drawing in greater detail, the reference numeral 10 represents an auto steering wheel lock protector according to the present invention, and which serves to securely cover an ignition lock 11 that protrudes from a side of a steering post column 12.

The lock protector 10 includes a strong metal case 13 having a semi-cylindrical notch 14 on one side for positioning against a side of the column 12, the notch having a cavity 15 into which the ignition lock 11 is fitted.

The case 13 is then secured to the column 12 by means of a U-shaped hasp or rod 16 having a row of ratchet teeth 17 at each end 18 and 19. The end 18 of the rod is freely pivotable and slidable in an opening 20 in the case. An enlarged head 21 on the end 18 of the rod prevents removal of the rod from the case. The other end 19 of the rod is removably slidable in an opening 22 of the case.

A flat metal plate 23 is slidable in a slot 24 of the case 13, the plate having a pair of slots 25 and 26 through which the rod ends 18 and 19 extend. A shank 27 integral with one end of the plate has an enlarged head 28 on its end, and a compression coil spring 29 around the shank bears at one end against the head 28 and bears at its other end against an end wall 30 of the case so to normally urge the plate to be slided into a position wherein the ratchet teeth 17 on each end of the rod are engaged or hooked with end edge 31 of each slot 25 and 26, thus locking the rod in a fixed position in the case.

An opening 32 in the case aligns with an opening 33 of the plate when the teeth 17 and slot end edge 31 are engaged; the openings 32 and 33 thus being able to receive a padlock 34 for securing the parts in their interlocked position.

In operative use, the case is fitted against a side of the steering post so to rest in the notch 14, and the ignition lock seat inside the cavity 15. The rod 16 is then swinged around the steering post 12 and the rod end 19 is inserted into opening 22 of the case. The teeth 17 on both ends 18 and 19 then hook under slot edges 31. A padlock is then fitted through openings 32 and 33 preventing the plate to slide and disengage teeth 17 with the slot edges 31. The ignition lock is thus covered so an unauthorized person cannot try to start up the vehicle engine.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. In an auto steering wheel lock protector, the combination of a case for enclosing an ignition lock protruding from a side of a steering post column, a U-shaped rod for retaining said case to said column, and a locking means for rigidly securing said rod to said case so to prevent dislodging thereof from enclosing said ignition switch; said case comprising a strong metal member having a notch on one side so to receive a cylindrical side of said column, and a cavity in said notch to receive said ignition lock; each opposite end of said U-shaped rod having a row of ratchet teeth, one said rod end being slidable in a first opening through said block while the other said rod end is slidable in a second opening through said block, each said rod ends also being slided through a separate slot formed in a transversely slidable plate within said case, a third opening of said case being aligned with a circular opening through said plate for receiving a padlock when said rows of ratchet teeth engage one end edges of said slots and providing said locking means.

* * * * *